No. 771,167. PATENTED SEPT. 27, 1904.
F. C. McCUTCHEN & A. G. SMITH.
NUT LOCK.
APPLICATION FILED MAR. 10, 1903.
NO MODEL.
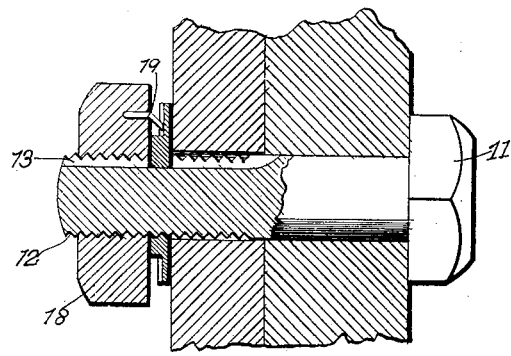
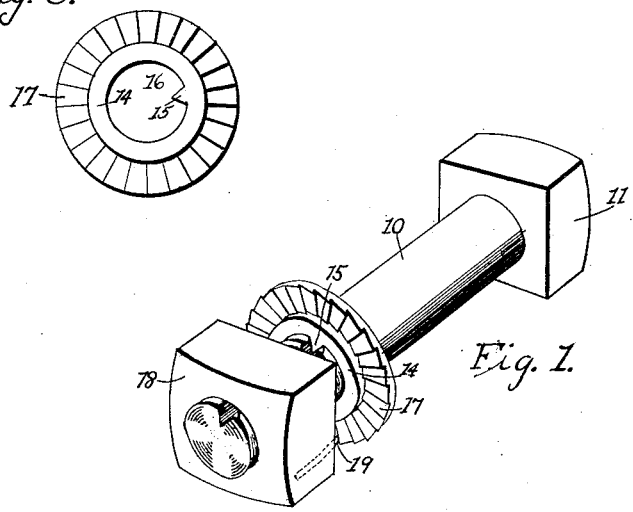
Witnesses.
K. K. Keffer
C. G. Hague
Inventors, F. C. McCutchen & A. G. Smith.
by Orwig & Lane, Attorneys.

No. 771,167.

Patented September 27, 1904.

UNITED STATES PATENT OFFICE.

FRED CLIFTON McCUTCHEN, OF HOLSTEIN, AND ARTHUR GEORGE SMITH, OF IOWA CITY, IOWA.

NUT-LOCK.

SPECIFICATION forming part of Letters Patent No. 771,167, dated September 27, 1904.

Application filed March 10, 1903. Serial No. 147,117. (No model.)

*To all whom it may concern:*

Be it known that we, FRED CLIFTON Mc-CUTCHEN, residing at Holstein, in the county of Ida, and ARTHUR GEORGE SMITH, residing at Iowa City, in the county of Johnson, State of Iowa, citizens of the United States, have invented certain new and useful Improvements in Nut-Locks, of which the following is a specification.

The object of our invention is to provide an improved nut-lock of simple, durable, and inexpensive construction.

Our invention consists in certain details in the construction, arrangement, and combination of the various parts of the device whereby the objects contemplated are attained, as hereinafter more fully set forth, pointed out in our claims, and illustrated in the accompanying drawings, in which—

Figure 1 shows a perspective view of the complete device. Fig. 2 shows a view, partly in section, of the complete device in position clamping two objects together; and Fig. 3 shows a face view of the ratchet-faced washer.

Referring to the accompanying drawings, we have used the reference-numeral 10 to indicate a bolt which is provided with a head 11 at one end and a screw-threaded portion 12 at its other end. It is also provided with a longitudinal V-shaped groove 13 at its screw-threaded end. The washer is disk-shaped and provided with a central opening 16, designed to receive the bolt, and also with a V-shaped projection 15, designed to enter the V-shaped groove 13 and prevent rotation of the washer on the bolt, while permitting free longitudinal movement thereof. The outer face of the washer is provided with a raised central rim 14, and surrounding this central rim 14 is a ratchet-faced surface 17, extending to the periphery of the washer, said ratchet-faced surface being of less thickness than the rim 14 for purposes hereinafter made clear.

The nut is indicated by the reference-numeral 18 and is of ordinary construction. In adapting the nut for use in connection with our improved nut-lock we bore a hole into the inner face of the nut parallel with the bolt-opening of the nut. We then insert a straight spring-metal pin 19 into said opening. The projecting end of said pin may be pointed, and the said pointed end of the pin projects a considerable distance from the face of the nut. In use we first pass the bolt through the objects to be connected. We then place the washer on the bolt with its V-shaped projection 15 in the V-shaped groove of the bolt, the ratchet-face of the washer being away from the objects to be clamped together. We then screw the nut upon the bolt, and the projecting pin 19 will engage the ratchet-faced portion of the washer first. As the nut is farther rotated this pin will be bent laterally in the direction opposite from the direction in which the nut is traveling, and the said pin will move from one tooth to the other of the ratchet, because the said pin is made of spring metal, and it will yield and pass over the teeth. Then when the inner face of the nut engages the face of the rim 14 of the washer it is obvious that the objects will be clamped together just as firmly as though the nut itself engaged the adjacent face of the objects being clamped. Furthermore, the said spring-pin 19 will serve as a lock to prevent a rotation of the nut in the direction required for unscrewing it. Inasmuch as the ratchet-faced portion 17 of the washer is of less thickness than the rim 14, the operator may, if he desires to detach the nut, insert a small lever between the adjacent faces of the nut and washer and press the inner end of the pin 19 away from the ratchet-faced surface, so that the nut may be easily unscrewed.

Obviously the nut and its locking springpin may be used any number of times, as the pin is not destroyed by being bent in the direction required for releasing it from the ratchet-faced surface.

Having thus described our invention, what we claim, and desire to secure by Letters Patent of the United States therefor, is—

An improved nut-lock, comprising a bolt having a screw-threaded portion and a longitudinal slot, a washer having a central opening to receive the bolt, a projection on the washer to enter the slot in the bolt, a flat raised rim on one face of the washer surrounding the bolt-opening thereof, a ratchet-faced surface formed on the same face of the nut surrounding the flat rim 14 and of less thickness than the flat rim, and extending to the periphery of the washer, a nut designed to receive the bolt having a flat inner face designed to engage the raised rim of the washer, and a spring-metal pin fixed in the nut parallel with the nut-opening projecting a considerable distance beyond the flat face of the nut and of such length and so arranged that when the nut is screwed to the bolt, the inner end of the spring-pin will first engage the ratchet-face of the washer and be bent laterally by a rotation of the nut before the flat face of the nut engages the flat rim of the washer, for the purposes stated.

FRED CLIFTON McCUTCHEN.
ARTHUR GEORGE SMITH.

Witnesses to signature of Fred Clifton McCutchen:
C. McCutchen,
Osker Berger.

Witnesses to signature of A. G. Smith:
Lamas G. Weld,
John V. Westfall.